(12) United States Patent
Lee et al.

(10) Patent No.: US 9,225,412 B2
(45) Date of Patent: Dec. 29, 2015

(54) COMMUNICATION SYSTEM WITH FEEDBACK MECHANISM AND METHOD OF OPERATION THEREOF

(71) Applicant: Samsung Electronics Co., Ltd., Gyeonggi-Do (KR)

(72) Inventors: Jungwon Lee, San Diego, CA (US); Junghyun Bae, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 7 days.

(21) Appl. No.: 13/759,409

(22) Filed: Feb. 5, 2013

(65) Prior Publication Data

US 2013/0308692 A1    Nov. 21, 2013

Related U.S. Application Data

(60) Provisional application No. 61/641,759, filed on May 2, 2012, provisional application No. 61/698,433, filed on Sep. 7, 2012.

(51) Int. Cl.
*H04B 1/38* (2015.01)
*H04B 7/06* (2006.01)
*H04L 1/00* (2006.01)

(52) U.S. Cl.
CPC .............. *H04B 7/0632* (2013.01); *H04L 1/00* (2013.01)

(58) Field of Classification Search
CPC .............. H04B 1/40; H04B 3/23; H04B 3/54; H04B 3/32; H04L 25/0266; H04L 25/4902; H04L 25/03343; H04L 7/033; H04L 1/243; H04L 1/0011

USPC .................................. 375/219–221, 260, 285
See application file for complete search history.

(56) References Cited

U.S. PATENT DOCUMENTS

2002/0186677 A1*  12/2002  Leung ............................ 370/342
2003/0039227 A1*   2/2003  Kwak ............................ 370/330

(Continued)

FOREIGN PATENT DOCUMENTS

| KR | 10-2011-0107723 | 10/2011 |
| KR | 10-2011-0114482 | 10/2011 |
| KR | 10-2011-0037948 |  4/2012 |

OTHER PUBLICATIONS

T. Cui, F. Lu, V. Sethuraman, A. Goteti, S. P. Rao, P. Subrahmanya, 'First order adaptive IIR filter for CQI prediction in HSDPA', in Proc. of IEEE WCNC, Apr. 2010.

(Continued)

*Primary Examiner* — Dac Ha
*Assistant Examiner* — Janice Tieu (57) ABSTRACT

A method of operation of a communication system includes: determining a channel estimate based on an arriving communication for characterizing a channel; calculating a conditional measure based on the channel estimate for characterizing the channel at a subsequent index; generating a channel-based probability function using the conditional measure, the channel-based probability function based on a feedback metric; determining a stochastic channel indicator based on a value of the feedback metric producing a target condition from the channel-based probability function; and sending the stochastic channel indicator for controlling communication at a base station for communication through a device.

20 Claims, 5 Drawing Sheets

(56) References Cited

U.S. PATENT DOCUMENTS

| | | |
|---|---|---|
| 2005/0237971 A1* | 10/2005 | Skraparlis .................... 370/329 |
| 2006/0018402 A1* | 1/2006 | Mehta et al. .................. 375/299 |
| 2007/0140207 A1* | 6/2007 | Narushima ................... 370/345 |
| 2007/0217361 A1* | 9/2007 | Vannithamby et al. ....... 370/329 |
| 2011/0002406 A1 | 1/2011 | Ming et al. |
| 2012/0020230 A1 | 1/2012 | Chen et al. |

OTHER PUBLICATIONS

H. Touheed, A. Quddus, R. Tafazolli, 'Predictive CQI Reporting for HSDPA', in Proc. of IEEE PIMRC, Sep. 2008.

F. Wang, T. Zhang, C. Feng, R. Li, 'Limited feedback scheme in the presence of feedback delay using Kalman filter', in Proc. of IEEE ICCTA, Oct. 2011.

* cited by examiner

COMMUNICATION SYSTEM WITH FEEDBACK MECHANISM AND METHOD OF OPERATION THEREOF

CROSS-REFERENCE TO RELATED APPLICATION(S)

This application claims the benefit of U.S. Provisional Patent Application Ser. No. 61/641,759 filed May 2, 2012, and U.S. Provisional Patent Application Ser. No. 61/698,433 filed Sep. 7, 2012, and the subject matter thereof is incorporated herein by reference thereto.

TECHNICAL FIELD

The embodiment of the present invention relates generally to a communication system, and more particularly to a communication system with feedback mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, which affect the quality and speed of the accessible data.

Thus, a need still remains for a communication system with feedback mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a communication system including: determining a channel estimate based on an arriving communication for characterizing a channel; calculating a conditional measure based on the channel estimate for characterizing the channel at a subsequent index; generating a channel-based probability function using the conditional measure, the channel-based probability function based on a feedback metric; determining a stochastic channel indicator based on a value of the feedback metric producing a target condition from the channel-based probability function; and sending the stochastic channel indicator for controlling communication at a base station for communication through a device.

An embodiment of the present invention provides a method of operation of a communication system including: determining a channel estimate based on an arriving communication for characterizing a channel; calculating a conditional probability based on the channel estimate for characterizing the channel with the conditional probability of the channel at a subsequent index given the channel estimate; calculating a block-error rate based on the conditional probability, the block-error rate as a function of a transmission rate; determining a stochastic channel indicator based on the transmission rate producing a target condition from the channel-based probability function; and sending the stochastic channel indicator for controlling communication at a base station for displaying on a device.

An embodiment of the present invention provides a communication system, including: a channel estimation module for determining a channel estimate based on an arriving communication for characterizing a channel; a conditional calculation module, coupled to the channel estimation module, for calculating a conditional measure based on the channel estimate for characterizing the channel at a subsequent index; a function generator module, coupled to the conditional calculation module, for generating a channel-based probability function using the conditional measure, the channel-based probability function based on a feedback metric; a feedback determination module, coupled to the function generator module, for determining a stochastic channel indicator based on a value of the feedback metric producing a target condition from the channel-based probability function; and a feedback output module, coupled to the feedback determination module, for sending the stochastic channel indicator for controlling communication at a base station for communication through a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the embodiment of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for embodiment of the present invention.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Figure 1:
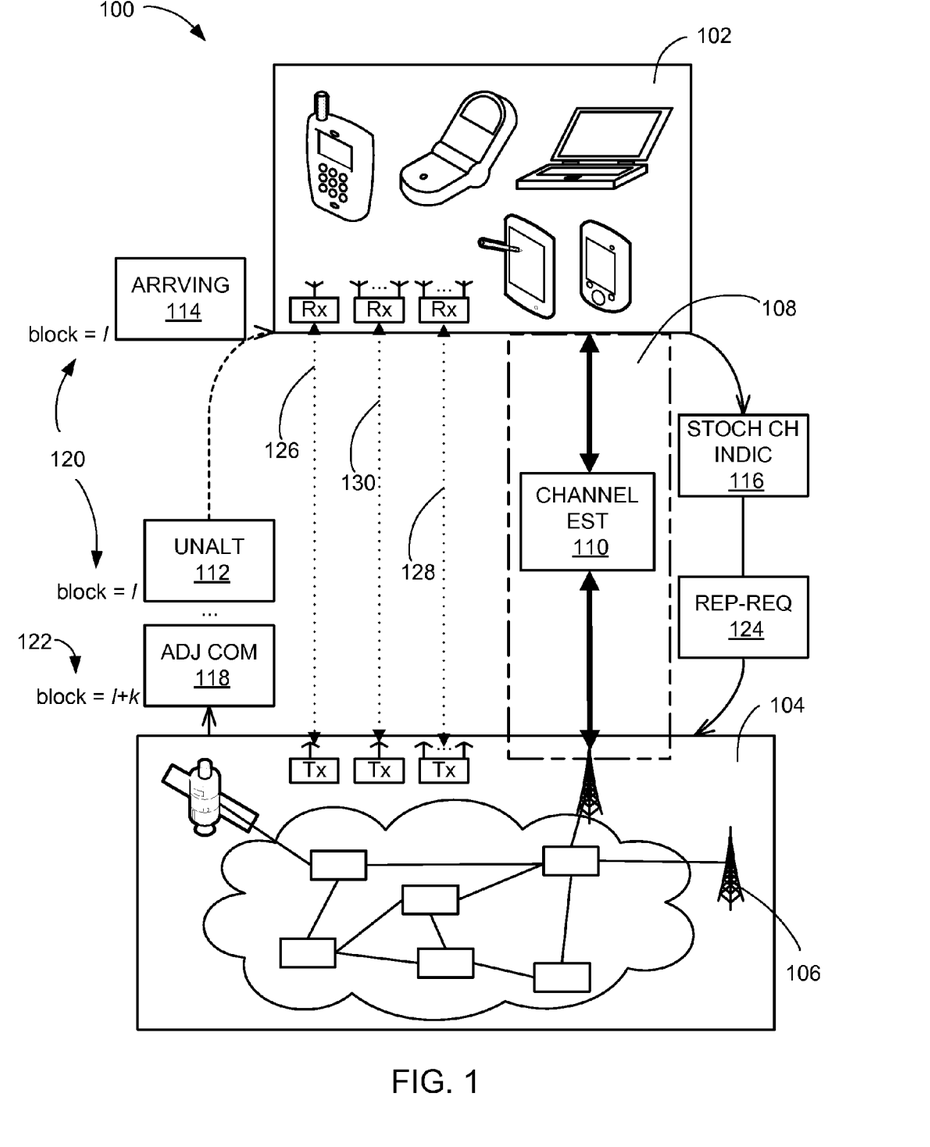
FIG. 1 is a communication system with feedback mechanism in an embodiment of the present invention.

Referring now to FIG. 1, therein is shown a communication system 100 with feedback mechanism in an embodiment of the present invention. The communication system 100 includes a mobile device 102, such as a cellular phone or a notebook computer, connected to a network 104. The network 104 is defined as a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer. The mobile device 102 can connect to and communicate with other devices, such as other mobile devices, servers, computers, telephones, or a combination thereof.

The base station 106 can be used to wirelessly exchange signals for communication, including voice signals of a telephone call or data representing a website and interactions therewith. The base station 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include reference portions, header portions, format portions, error correction or detection portion, or a combination thereof imbedded in the communicated information. The reference portions, header portions, format portions error correction or detection portion, or a combination thereof can include a predetermined bit, pulse, wave, symbol, or a combination thereof. The various portions can be embedded within the communicated signals at regular time intervals, frequency, code, or a combination thereof.

The mobile device 102 can communicate with the base station 106 through a channel 108. The channel 108 can be wireless, wired, or a combination thereof. The channel 108 can be a direct link between the mobile device 102 and the base station 106 or can include repeaters, amplifiers, or a combination thereof. For example, the channel 108 can include communication frequency, time slot, packet designation, transmission rate, channel code, or a combination thereof used for transmitting signals between the mobile device 102 and the base station 106.

The channel 108 and the effects thereof can be represented by a channel estimate 110. The channel estimate 110 is defined as a description of changes to signals caused by the channel 108. The channel estimate 110 can describe and quantize reflection, loss, refraction, obstructions, or a combination thereof a signal can experience while traversing between the base station 106 and the mobile device 102. The channel estimate 110 can further characterize interference the mobile device 102 can experience from other transmitters, such as other mobile devices or other base stations, or from the movement of the mobile device 102.

For example, the base station 106 can transmit an unaltered transmission 112. The unaltered transmission 112 can change while traversing through the channel 108 due to the qualities therein, such as from delayed signal reflections from various buildings, from interferences other nearby transmitting sources, from the Doppler Effect experienced when the mobile device 102 is in transit, or a combination thereof. The mobile device 102 can receive an arriving communication 114, which is the unaltered transmission 112 that has been changed due to qualities of the channel 108.

The mobile device 102 can determine the channel estimate 110 from the arriving communication 114. For example, the mobile device 102 can compare the information in the reference or training portion to the standardized or intended information in the reference or training portion to estimate the channel estimate 110.

The communication system 100 can employ link adaptation methods for controlling the communication between devices. Link adaptation method can have the mobile device 102 feedback and report information associated with the channel 108 to the base station 106. The base station 106 can use the feedback information to adjust various aspects of the communication with the mobile device 102.

The mobile device 102 can send a stochastic channel indicator 116 to the base station 106 based on information regarding the channel estimate 110. The stochastic channel indicator 116 is defined as probability based information regarding communication quality related to characterization of the channel 108. For example, the stochastic channel indicator 116 can be characterization information of the channel 108, such as rating or identification information, communication signal rate, loss rate, or a combination thereof.

For illustrative purpose, the stochastic channel indicator 116 will be discussed as a transmission rate based on an error related probability. However, it is understood that the stochastic channel indicator 116 can be different as described above. For example, the stochastic channel indicator 116 can include the channel estimate 110 or a portion thereof, an error rate, or a combination thereof.

The base station 106 can receive the stochastic channel indicator 116 and adjust various aspects of the communication with the mobile device 102 accordingly. For example, the base station 106 can adjust the transmission rate, modulation, coding, information in the signal portion, information in the header portion, information in the protocol portion, or a combination thereof based on the stochastic channel indicator 116.

The base station 106 can determine channel state information at the transmitter (CSIT) based on the stochastic channel indicator 116. The base station 106 can subsequently send an adjusted communication 118 with adjustments to the transmission rate, modulation, coding, information in the signal portion, information in the header portion, information in the protocol portion, or a combination thereof based on the stochastic channel indicator 116.

The communication system 100 employing link adaptation method can inherently have a delay between characterizing the channel 108 based on a communication, feeding information back to the base station 106, and making the adjustment based on the communication. The delay can cause the adjustments to be incorrect due to changes in the channel 108 during the delay.

For example, the mobile device 102 can characterize the channel 108 based on the arriving communication 114 corresponding to the unaltered transmission 112. The characterization of the channel 108 will represent the channel estimate 110 at the time of receiving the arriving communication 114. The channel 108 can change during the time necessary to determine the channel estimate 110, send feedback information to the base station 106, and have the base station 106 make adjustments accordingly. Hence, the adjustments made based on the arriving communication 114 may not be relevant due to changes in the channel 108 at the time of transmitting the adjusted communication 118.

Continuing with the example, the arriving communication 114 and the unaltered transmission 112 can include the communicated information identified with a reference index 120. The reference index 120 can be identifying information for a transmitted set of information, such as an index or a number for a block or a packet of information. The adjusted communication 118 can include the communicated information identified with a subsequent index 122. The subsequent index 122 can be identifying information for a set of information transmitted after the reference index 120.

For a more specific example, the arriving communication 114 and the unaltered transmission 112 can have the reference index 120 of '1'. The adjusted communication 118 can have the subsequent index 122 of '1+k'. The addition of 'k' in the subsequent index 122 can represent the delay in time between sending the unaltered transmission 112 and the adjusted communication 118, caused by receiving the arriving communication 114, determining the channel estimate 110, sending feedback information, and adjusting the communication parameters according to the feedback information.

To account for the delay, the stochastic channel indicator 116 can be based on a characterization of the channel 108 likely to occur in the future. The stochastic channel indicator 116 can be based on a characteristic of the channel 108 likely to occur when transmitting information corresponding to the subsequent index 122 or a behavior of signals traversing the channel 108 at a time corresponding to the subsequent index 122 occurring after that of the reference index 120.

Moreover, the stochastic channel indicator 116 can be based on estimates based on a probability rather than an estimate for entirety of the channel 108 at the latter time. For example, the stochastic channel indicator 116 can be based on estimated outage probability, estimated error rates, or a combination thereof instead of channel estimation for the future time. Details regarding the stochastic channel indicator 116 will be discussed in detail below.

It has been discovered that the stochastic channel indicator 116 provides improved throughput and reduction in memory. The stochastic channel indicator 116 provides improved execution time and memory space by enabling probability based calculations for determining feedback information instead of computationally costly channel estimation for future behavior. The stochastic channel indicator 116 further provides improved throughput by accurately indicating an aspect of future behavior of the channel 108 that the base station 106 can use to adjust various aspects of the communication.

It has also been discovered that the stochastic channel indicator 116 decreases errors and enhances the error rates quicker for the communication system 100. The stochastic channel indicator 116 decreases errors and faster adjustments by eliminating lookup tables which requires the table elements to stabilize with enough sample data. The stochastic channel indicator 116 enables the communication system 100 to operate without prior sample data.

The communication from the base station 106 to the mobile device 102 at the reference index 120 of '1' and having a code block length of 'N' can be expressed as:

$$y_1[n]=h_1x_1[n]+z_1[n]; \text{ for } n=0,\ldots,N-1. \qquad \text{Equation (1)}.$$

The arriving communication 114 at the mobile device 102 can be represented by $y_1$. The unaltered transmission 112 from the base station 106 can be represented by $x_1$ and $h_1$ can represent effects from the channel 108, which can be estimated with the channel estimate 110. The noise experienced by the mobile device 102 can be represented by $z_1$.

When received information cannot be processed correctly, the mobile device 102 can send a repeat-request 124 to the base station 106. For example, if the arriving communication 114 contains an uncorrectable error due to degradation or interference from the channel 108, the mobile device 102 can send the repeat-request 124. The base station 106 can retransmit the unaltered transmission 112 or different information for correcting the error based on the rep eat-request 124.

For illustrative purposes, the base station 106 will be described as transmitting signals and the mobile device 102 as receiving and replying to the transmitted signals. However, it is understood that both the mobile device 102 and the base station 106 can each transmit and receive signals.

Also for illustrative purposes, the communication system 100 will be described as employing a single-input single-output (SISO) scheme 126 for communicating with one antenna on the transmitter and one antenna on the receiver. However, it is understood that the communication system 100 can employ a multiple-input multiple-output (MIMO) scheme 128 including a single-input multiple-output (SIMO) scheme 130 and a multiple-input single-output (MISO) scheme. The multiple-input multiple-output scheme 128 can have one or more antennas on the transmitter end, at the base station 106, communicating with one or more antennas on the receiver end, at the mobile device 102.

The multiple-input multiple-output scheme 128 can include the single-input multiple-output scheme 130 having a single antenna at the base station 106 communicating with multiple antennas on the mobile device 102. The multiple-input multiple-output scheme 128 can further include the multiple-input single-output scheme having multiple antennas at the base station 106 communicating with a single antenna on the mobile device 102

For further illustrative purposes, the mobile device 102 will be described as directly communicating with the base station 106. However, it is understood that the mobile device 102 can communicate with the base station 106 through other devices, such as a repeater, another mobile device, a router, or a combination thereof. It is also understood that the mobile device 102 can access the network 104 through devices other than the base station 106.

Figure 2:
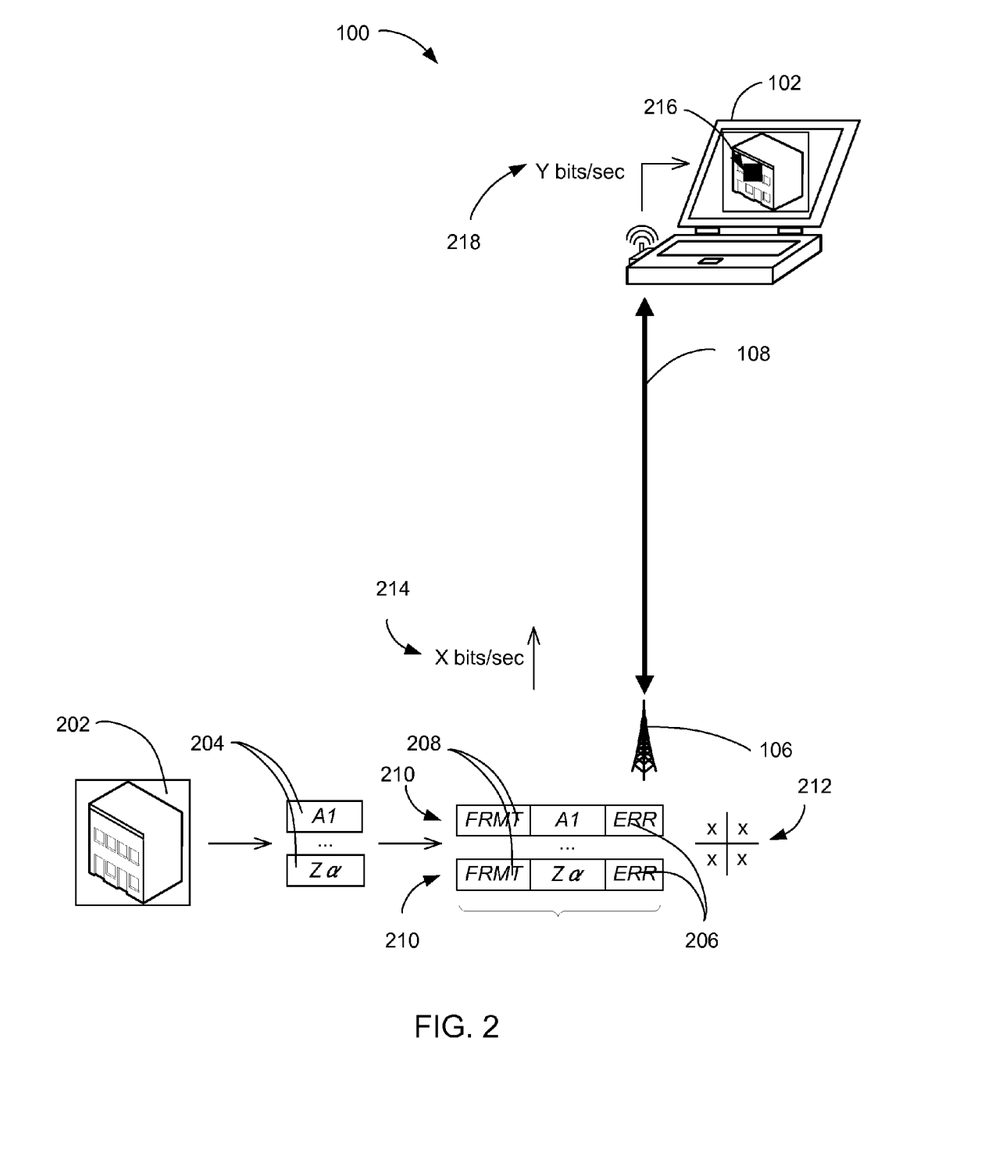
FIG. 2 is an example of communication between the mobile device and the base station.

Referring now to FIG. 2, therein is shown an example of communication between the mobile device 102 and the base station 106. The base station 106 can send an actual message 202. The actual message 202 can include images, sounds, or a combination thereof for communicating to the user through the mobile device 102. The actual message 202 can be communicated to the user by sending the actual message 202 through the channel 108 to the mobile device 102 and displaying, reproducing sounds, or a combination thereof for the actual message 202 using the mobile device 102.

The actual message 202 or a portion thereof can be transformed into a message portion 204. The message portion 204 can include electronic bits that the computing system 100 can interpret to represent and reproduce the actual message 202.

A comparison portion 206, a format portion 208, or a combination thereof can be added to the message portion 204 to generate a transmission block 210 to be communicated as the unaltered transmission 112 of FIG. 1. The comparison portion 206 can include information used for detecting, correcting, or a combination of processes thereof for errors within the transmission block 210. The comparison portion 206 can include checksum information, error correction bits, redundant information, retransmitted information, or a combination thereof.

The format portion 208 can include information regarding details of method of communication. The format portion 208 can include various information, such as rate of communication, transmitting method, length of communicated information, coding information, or a combination thereof. The format portion 208 can include information regarding a modulation-coding scheme 212, a transmission rate 214, or a combination thereof for transmitting the group of information.

The modulation-coding scheme 212 can include modulation such as quadrature amplitude modulation (QAM), phase shift keying (PSK), or various derivations thereof and coding scheme such as turbo code, low-density parity-check (LDPC) code, or various derivations thereof. Modulation can be the transmitting methods using various symbols, frequencies, phases, magnitudes, bit arrangement, bit representation, or a combination thereof.

Coding scheme can involve a code rate, such as ½ or ¾, for representing comparison between actual message portion and redundant, header, or error related information in the transmitted information. For example, a code rate can include a ratio between lengths or sizes of the message portion 204 and the transmission block 210 having the message portion 204 therein or a ratio between lengths or sizes of the message portion 204 and the combination of the message portion 204 and the comparison portion 206.

The transmission rate 214 can be the amount of information sent from the base station 106 to the mobile device 102 within a period of time. For example, the transmission rate 214 can be represented in amount of bits or bytes per second.

For a more specific example, the intended communication 202 can be an image of a building having a size of 20 megabits. The intended communication 202 can be processed into instances of the message portion 204, each having a size of 50 bits. The format portion 208 and the comparison portion 206 can each have a size of 25 bits, and the transmission block 210 can have 100 bits total.

Continuing with the example, the base station 106 can transmit the unaltered transmission 112 using the modulation-coding scheme 212 in 0.2 milliseconds to have the transmission rate 214 of 500 kilobits-per-second. The transmission rate 214 can also include the coding rate of ½, equivalent to 50 bits of the message portion 204 compared to 100 bits of the unaltered transmission 112, or ⅔, equivalent to 50 bits of the message portion 204 compared to the combination of 50 bits and 25 bits for the message portion 204 and the comparison portion 206 respectively.

After generating the transmission block 210, the base station 106 can transmit it according to the modulation-coding scheme 212, the transmission rate 214, or a combination thereof as the unaltered transmission 112. The mobile device 102 can receive the arriving communication 114 of FIG. 1 corresponding to the unaltered transmission 112 after degradation and interference due to the channel 108.

The mobile device 102 can recover the group of information in the unaltered transmission 112 from the arriving communication 114 by undoing the effects of the channel 108 and recover the transmission block 210. The mobile device 102 can also use the information in the format portion 208, the comparison portion 206, or a combination thereof to process the message portion 204 from the arriving communication 114. The mobile device 102 can use the message portion 204 to recreate the actual message 202 using user-interfacing portions of the mobile device 102, such as by displaying an image on a display screen, by reproducing sounds through speakers, or a combination thereof.

During the receiving and processing of the arriving communication 112, the mobile device 102 can detect, correct, or a combination of processes regarding errors. The errors can be caused by the channel 108, noise, interference, or a combination thereof. The mobile device 102 can determine a block-error rate 216. The errors can be detected using the comparison portion 206, or can be corrected with the comparison portion 206, when the arriving communication 112 does not follow prescribed formats, or a combination thereof.

The block-error rate 216 is defined as a measure representing number of errors detected or encountered for a given amount of processed data. The block-error rate 216 can be represented as a ratio or a percentage. The block-error rate 216 can represent a number of erroneous units within a group of units. For example, the block-error rate 216 can be the number of blocks determined to have errors compared to a total number of received blocks.

As a more specific example, the intended communication 202 having a size of 20 megabits can be divided into 400,000 instances of the message portion 204, each having a size of 50 bits, which are grouped and transmitted from the base station 106 to the mobile device 102. The mobile device 102 can determine the block-error rate 216 as 1/50 or 2% when 8,000 instances of 400,000 instances of the message portion 204 included an error or were detected as being erroneous.

The mobile device 102 can further determine a throughput rate 218. The throughput rate 218 is defined as an amount of data used for recreating the actual message 202 at the mobile device 102 over a given period of time. The throughput rate 218 can be non-erroneous units processed by the mobile device 102 within a unit of time.

For example, the throughput rate 218 can be the number of non-erroneous instances of the blocks, such as the arriving communication 112, or the non-erroneous instances of the message portion 204 therein, or the number of corresponding bits transmitted and processed in a second. Also for example, the throughput rate 218 can be determined using a number of non-erroneous instances of the blocks, size of the message portion 204, size of the comparison portion 206, size of the format portion 208, the transmission rate 214, and the block-error rate 216.

As a more specific example, the intended communication 202 having a size of 20 megabits can be divided into 400,000 instances of the message portion 204. Each instance of the message portion can have 25 bits each of the comparison portion 206 and the format portion 208 added thereto to generate 400,000 instances of the blocks, such as the unaltered transmission 112 or the adjusted communication 118 of FIG. 1, for communicating the intended communication 202.

Continuing with the example, the blocks can be transmitted at the transmission rate 214 of 500 kilobits-per-second. The transmission of the 400,000 blocks can be complete in 80 seconds. In processing the received blocks, the mobile device 102 can determine the block-error rate 216 of 2%. The mobile device 102 can determine the throughput rate 218 as a ratio between 392,000 non-erroneous blocks each having a size of 100 bits and total transmission time of 80 seconds. The mobile device 102 can determine the throughput rate 218 as 4.9 kilo-blocks per second or 490 kilobits per second.

Continuing with the example, the throughput rate 218 can be a ratio between 392,000 non-erroneous instances of the message portion 204 each having a size of 50 bits and the total transmission time of 80 seconds. The mobile device 102 can determine the throughput rate 218 as 245 kilobits per second.

The method for determining the throughput rate 218 can be predetermined by a standard, the communication system 100, or a combination thereof. Details regarding the throughput rate 218, along with details regarding the block-error rate 216, will be discussed below.

For illustrative purposes, the block-error rate 216 and the throughput rate 218 are described as being determined without retransmissions based on the repeat-request 124 of FIG. 1. However, it is understood that both the block-error rate 216 and the throughput rate 218 can be determined in a similar method as described when erroneous blocks are retransmitted based on the repeat-request 124.

Figure 3:
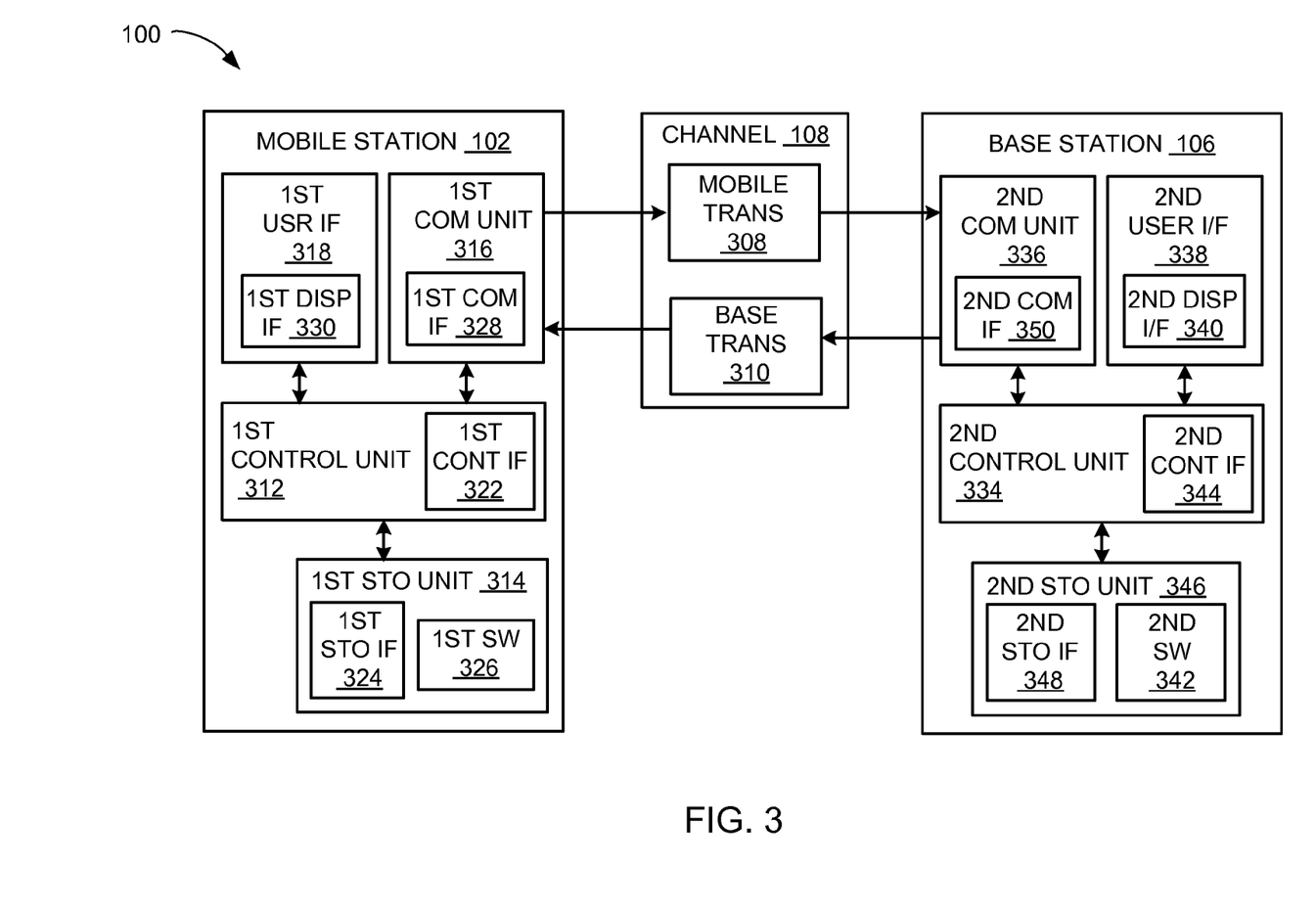
FIG. 3 is an exemplary block diagram of the communication system.

Referring now to FIG. 3, therein is shown an exemplary block diagram of the communication system 100. The communication system 100 can include the mobile device 102, the network 104, and the base station 106. The mobile device 102 can send information in a mobile transmission 308 over the network 104 to the base station 106. The base station 106 can send information in a base transmission 310 over the network 104 to the mobile device 102.

For illustrative purposes, the communication system 100 is shown with the mobile device 102 as a client device, although it is understood that the communication system 100 can have the mobile device 102 as a different type of device. For example, the mobile device 102 can be a server having a display interface.

Also for illustrative purposes, the communication system 100 is shown with the base station 106 as a server, although it is understood that the communication system 100 can have the base station 106 as a different type of device. For example, the base station 106 can be a client device.

For brevity of description in this embodiment of the present invention, the mobile device 102 will be described as a client device and the base station 106 will be described as a server device. The embodiment of the present invention is not limited to this selection for the type of devices. The selection is an example of the embodiment of the present invention.

The mobile device 102 can include a first control unit 312, a first storage unit 314, a first communication unit 316, and a first user interface 318. The first control unit 312 can include a first control interface 322. The first control unit 312 can execute a first software 326 to provide the intelligence of the communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the mobile device 102. The first control interface 322 can also be used for communication that is external to the mobile device 102.

The first control interface 322 can receive information from the other functional units or from external sources, or can transmit information to the other functional units or to external destinations. The external sources and the external destinations refer to sources and destinations external to the mobile device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the mobile device 102. The first storage interface 324 can also be used for communication that is external to the mobile device 102.

The first storage interface 324 can receive information from the other functional units or from external sources, or can transmit information to the other functional units or to external destinations. The external sources and the external destinations refer to sources and destinations external to the mobile device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the mobile device 102. For example, the first communication unit 316 can permit the mobile device 102 to communicate with the base station 106 of FIG. 1, an attachment, such as a peripheral device or a computer desktop, and the network 104.

The first communication unit 316 can also function as a communication hub allowing the mobile device 102 to function as part of the network 104 and not limited to be an end point or terminal unit to the network 104. The first communication unit 316 can include active and passive components, such as microelectronics or an antenna, for interaction with the network 104.

The first communication unit 316 can include a first communication interface 328. The first communication interface 328 can be used for communication between the first communication unit 316 and other functional units in the mobile device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the mobile device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the communication system 100. The first control unit 312 can also execute the first software 326 for the other functions of the communication system 100. The first control unit 312 can further execute the first software 326 for interaction with the network 104 via the first communication unit 316.

The base station 106 can be optimized for implementing the embodiment of the present invention in a multiple device embodiment with the mobile device 102. The base station 106 can provide the additional or higher performance processing power compared to the mobile device 102. The base station 106 can include a second control unit 334, a second communication unit 336, and a second user interface 338.

The second user interface 338 allows a user (not shown) to interface and interact with the base station 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the base station 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the mobile device 102 over the network 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the base station 106. The second controller interface 344 can also be used for communication that is external to the base station 106.

The second controller interface 344 can receive information from the other functional units or from external sources, or can transmit information to the other functional units or to external destinations. The external sources and the external destinations refer to sources and destinations external to the base station 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between other functional units in the base station 106. The second storage interface 348 can also be used for communication that is external to the base station 106.

The second storage interface 348 can receive information from the other functional units or from external sources, or can transmit information to the other functional units or to external destinations. The external sources and the external destinations refer to sources and destinations external to the base station 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the base station 106. For example, the second communication unit 336 can permit the base station 106 to communicate with the mobile device 102 over the network 104.

The second communication unit 336 can also function as a communication hub allowing the base station 106 to function as part of the network 104 and not limited to be an end point or terminal unit to the network 104. The second communication unit 336 can include active and passive components, such as microelectronics or an antenna, for interaction with the network 104.

The second communication unit 336 can include a second communication interface 350. The second communication interface 350 can be used for communication between the second communication unit 336 and other functional units in the base station 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the network 104 to send information to the base station 106 in the mobile transmission 308. The base station 106 can receive information in the second communication unit 336 from the mobile transmission 308 of the network 104.

The second communication unit 336 can couple with the network 104 to send information to the mobile device 102 in the base transmission 310. The mobile device 102 can receive information in the first communication unit 316 from the base transmission 310 of the network 104. The communication system 100 can be executed by the first control unit 312, the second control unit 334, or a combination thereof. For illustrative purposes, the base station 106 is shown with the partition having the second user interface 338, the second storage unit 346, the second control unit 334, and the second communication unit 336, although it is understood that the base station 106 can have a different partition. For example, the second software 342 can be partitioned differently such that some or all of its function can be in the second control unit 334 and the second communication unit 336. Also, the base station 106 can include other functional units not shown in FIG. 3 for clarity.

The functional units in the mobile device 102 can work individually and independently of the other functional units. The mobile device 102 can work individually and independently from the base station 106 and the network 104.

The functional units in the base station 106 can work individually and independently of the other functional units. The base station 106 can work individually and independently from the mobile device 102 and the network 104.

For illustrative purposes, the communication system 100 is described by operation of the mobile device 102 and the base station 106. It is understood that the mobile device 102 and the base station 106 can operate any of the modules and functions of the communication system 100.

Figure 4:
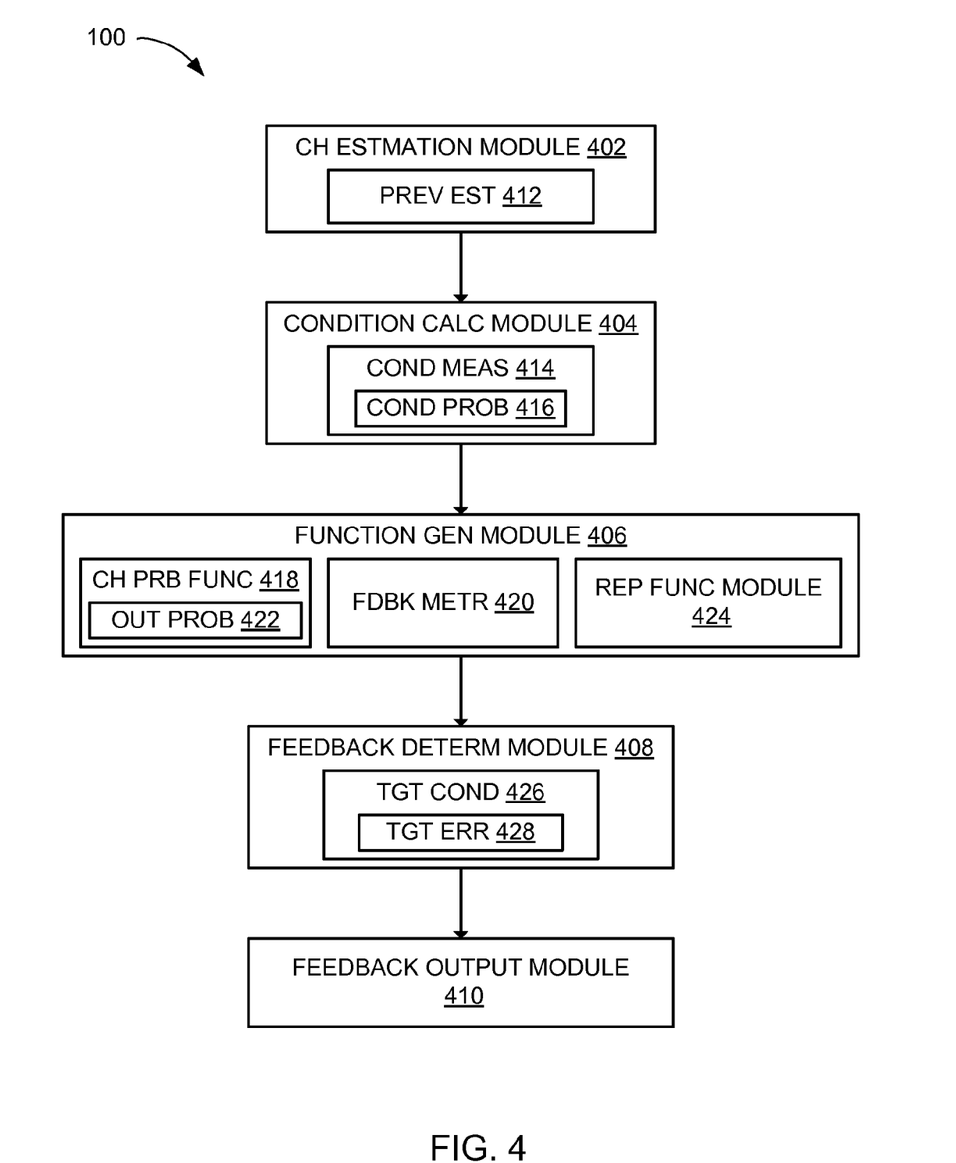
FIG. 4 is a control flow of the communication system.

Referring now to FIG. 4, therein is shown a control flow of the communication system 100. The communication system 100 can include a channel estimation module 402, a conditional calculation module 404, a function generator module 406, a feedback determination module 408, and a feedback output module 410.

The channel estimation module 402 can be coupled to the conditional calculation module 404, which can be coupled to the function generator module 406. The function generator module 406 can be further coupled to the feedback determination module 408, which can be coupled to the feedback output module 410.

For example, one or more outputs of the channel estimation module 402 can be connected to one or more inputs of the conditional calculation module 404, and one or more outputs of the conditional calculation module 404 can be connected to one or more inputs of the function generator module 406. One or more outputs of the function generator module 406 can be connected to one or more inputs of the feedback determination module 408, which can be similarly connected to the feedback output module 410.

The channel estimation module 402 is for characterizing the channel 108 of FIG. 1. The channel estimation module 402 can characterize the channel 108 by determining the channel estimate 110 of FIG. 1 based on the arriving communication 114 of FIG. 1.

The channel estimation module 402 can determine the channel estimate 110 using a variety of methods. For example, the channel estimation module 402 can use reference communications, such as pilot tone or reference signal, transmitted by the base station 106 of FIG. 1 to determine the channel estimate 110. The details regarding transmitted reference communications, such as original frequency, phase, content, or a combination thereof, can be predetermined by the communication standard, the communication system 100, or a combination thereof.

Continuing with the example, the channel estimation module 402 can compare the received instances of the reference communications to the parameters predetermined by the communication standard, the communication system 100, or a combination thereof for the reference communications. The channel estimation module 402 can calculate the changes in magnitude, frequency, phase, or a combination thereof in the reference communication of the arriving communication 114.

Continuing with the example, the channel estimation module 402 can further use frequency or time domain transformation, convolution, transposition, basic mathematical operations, or a combination thereof with the predetermined or received instances of the reference communication, or both. The channel estimation module 402 can also use methods such as the least square method, the least mean square (LMS) method, or the minimum mean square error (MMSE) method to determine the channel estimate 110.

The channel estimation module 402 can receive the arriving communication 114 and the reference portion therein using the first communication unit 316 of FIG. 3. The channel estimation module 402 can use the first control unit 312 of FIG. 3, the second control unit 334 of FIG. 3, or a combination thereof to determine the channel estimate 110 to estimate and characterize the channel 108. The channel estimation module 402 can pass the channel estimate 110 to the conditional calculation module 404, store it in the first storage unit 314 of FIG. 3, store it in the second storage unit 346 of FIG. 3, or a combination thereof.

The channel estimation module 402 can retain the channel estimate 110 as previous estimations 412 during communication. The channel estimation module 402 can store the channel estimate 110 as an instance of the previous estimations 412 when a new instance of the arriving communication 114 is received or processed.

The previous estimations 412 can be stored in the order of reception or indexed, such that estimated values can be associated to communication indices, such as the reference index 120 of FIG. 1 or the instances occurring before the reference index 120, or time. The channel estimation module 402 can store the previous estimations 412 in the first storage unit 314, the second storage unit 346, or a combination thereof.

After characterizing the channel 108, the control flow can be passed to the conditional calculation module 404. The conditional calculation module 404 is for calculating a conditional measure 414 based on the channel estimate 110, the previous estimations 412, or a combination thereof for characterizing the channel 108 at the subsequent index 122 of FIG. 1.

The conditional measure 414 is defined as an estimation of correlation between future behavior of the channel 108 and current or past behavior of the channel 108. The conditional measure 414 can be a relationship between the channel estimate 110, the previous estimations 412, or a combination thereof and an estimation of behavior or characteristic of the channel 108 at the subsequent index 122.

For example, the conditional measure 414 can be a conditional probability 416. The conditional probability 416 is defined as likelihood for the channel estimate 110 at the subsequent index 122 given the channel estimate 110 at the reference index 120 or any previous indices. The conditional probability 416 can be expressed as:

$$P(h_{l+k}|h_l).\qquad\text{Equation (2).}$$

The conditional probability 416 can be the conditional measure 414 of the channel 108 at the subsequent index 122 of 'l+k', expressed as $h_{l+k}$, given the channel estimate 110 as an observation of the channel 108 at the reference index 120 of 'l', expressed as $h_l$.

Also for example, the conditional measure 414 can be based on the previous estimations 412. The conditional probability 416 can be the conditional measure 414 of the channel 108 at the subsequent index 122 given previous observations of the channel 108 of the previous estimations 412.

The conditional calculation module 404 can calculate the conditional probability 416 assuming Rayleigh fading for the channel 108 and Jakes' model, $h_l$ approximated as CN(0, 1) and $$\begin{bmatrix}h_l\\h_{l+k}\end{bmatrix}\sim CN\left(\begin{bmatrix}0\\0\end{bmatrix},\begin{bmatrix}1 & J_0(2\pi f_D kT_b)\\J_0(2\pi f_D kT_b) & 1\end{bmatrix}\right).\qquad\text{(Equation 3).}$$

In Equation 2, can $f_D$ represent Doppler frequency, $T_b$ can represent block duration, and $J_0$ can be a zero-order Bessel function of the first kind. Further, $C_l$ can represent capacity with the channel 108 represented by $h_l$, where:

$$C_l = \log_2(1+|h_l|^2 SNR).\qquad\text{Equation (4).}$$

Given equation 2, the conditional calculation module 404 can calculate the conditional probability 416 by approximating $h_{l+k}$ as:

$$h_{l+k}\sim CN(Ch_l, 1-C^2).\qquad\text{Equation (5).}$$

The conditional calculation module 404 can use the first control unit 312, the second control unit 334, the first communication unit 316, the second communication unit 336 of FIG. 3, or a combination thereof to approximate and calculate the conditional measure 414, including the conditional probability 416. The conditional calculation module 404 can store the conditional measure 414, including the conditional probability 416 in the first storage unit 314, the second storage unit 346, or a combination thereof.

The conditional calculation module 404 can further pass the conditional measure 414 to the function generator module 406. The conditional calculation module 404 can have the output thereof connected to the input of the function generator module 406 with the conditional measure 414 as the output of the conditional calculation module 404. The conditional calculation module 404 can also pass the conditional measure 414 by storing the conditional measure 414 at a location accessible and known to the function generator module 406 and alert the function generator module 406 after storage, such as through a status signal or a flag.

The function generator module 406 is for generating a probability based function used for determining the stochastic channel indicator 116 of FIG. 1. The function generator module 406 can generate the function by generating a channel-based probability function 418 using the conditional measure 414. The channel-based probability function 418 is defined as a description of a relationship involving a likelihood of a characteristic of the channel 108. The channel-based probability function 418 can be based on a feedback metric 420 and describe the likelihood of a particular characteristic of the channel 108 as a function of the feedback metric 420.

The feedback metric 420 is defined as a standardized method of reporting characterizations of the channel 108 to the base station 106. For example, the feedback metric 420 can be the channel estimate 110 or the transmission rate 214 of FIG. 2.

The channel-based probability function 418 can include an outage probability function 422. The outage probability function 422 is defined as likelihood that the mobile device 102 is outside a coverage area of the base station 106 or affected by the channel 108. The outage probability function 422 can be expressed as:

$$P_{out}(R) = P\{C_{l+k} < R \mid h_l\}.\qquad\text{Equation (6).}$$

$$P_{out}(R) = P\left\{|h_{l+k}|^2 < \frac{2^R - 1}{SNR}\,\Big|\,h_l\right\}.\qquad\text{Equation (7).}$$

The $P_{out}$ can represent the outage probability function 422, $C_{l+k}$ can represent the capacity of the channel 108 at the subsequent index 122 of l+k, and R can represent the feedback metric 420, such as the transmission rate 214. The signal to noise ratio can be represented by 'SNR'.

The function generator module 406 can calculate the outage probability function 422 by using:

$$P\{|h_{l+k}|^2 < x \mid h_l\} = 1 - Q_1\left(\sqrt{\frac{2|Ch_l|^2}{1-C^2}}, \sqrt{\frac{2x}{1-C^2}}\right). \quad \text{Equation (8)}.$$

The function $Q_1$ can be a Marcum Q-function defined as:

$$Q_1(a, b) = \int_b^\infty x \exp\left(-\frac{x^2 + a^2}{2}\right) I_0(ax) dx. \quad \text{Equation (9)}.$$

The function $I_0$ can be a modified Bessel function of order 0.

The function generator module 406 can also generate the channel-based probability function 418 by calculate the block-error rate 216 of FIG. 2. The function generator module 406 can calculate the block-error rate 216 at the subsequent index 122 as a function of the transmission rate 214 using equations (6)-(9) and setting $P_{out}$ as the block-error rate 216.

The block-error rate 216 at the subsequent index 122 can be similar to the outage probability function 422. By using the outage probability function 422 as the block-error rate 216 at the subsequent index 122, the function generator module 406 can calculate the conditional measure 414 for characterizing the channel 108 for the subsequent index 122 as a random variable without estimating the channel 108 at the subsequent index 122.

The function generator module 406 can have a repeat function module 424. The repeat function module 424 is for generating the channel-based probability function 418 when the repeat-request 124 of FIG. 1 is available. The communication system 100 can perform with the stochastic channel indicator 116 when the repeat-request 124 is available to the communication system 100. The repeat function module 424 can calculate or adjust the channel-based probability function 418 based on calculating probability of outages involving the repeat-request 124.

The repeat function module 424 can calculate or adjust the channel-based probability function 418 including the outage probability function 422 approximating the block-error rate 216 at the subsequent index 122 considering the repeat-request 124 using:

$$P_{out|h_{l+k_1}}(R) = P\left\{|h_{l+k_2}|^2 < \frac{2^{R-C_{l+k_1}} - 1}{SNR} \mid h_{l+k_1}, h_l\right\}. \quad \text{Equation (10)}.$$

For equation 10, the channel 108 behavior at an index subsequent to the subsequent index 122 as related to the repeat-request 124 can be expressed as:

$$h_{l+k_2} \sim CN(A(h_{l+k_1}, h_l)^T, 1 - AC_1^H). \quad \text{Equation (11)}.$$

Further, the repeat function module 424 can calculate the outage probability function 422 approximating the block-error rate 216 using:

$$P\{|h_{l+k_2}|^2 < x \mid h_{l+k_1}, h_l\} = \quad \text{Equation (12)}.$$

$$1 - Q_1\left(\sqrt{\frac{2|A(h_{l+k_1}, h_l)^T|^2}{1 - AC_1^H}}, \sqrt{\frac{2x}{1 - AC_1^H}}\right).$$

The function generator module 406, including the repeat function module, can use the first control unit 312, the second control unit 334, or a combination thereof to generate the channel-based probability function 418 including the outage probability function 422. The function generator module 406 can store the channel-based probability function 418 including the outage probability function 422 in the first storage unit 314, the second storage unit 346, or a combination thereof.

It has been discovered that the channel-based probability function 418 including the outage probability function 422 for approximating the block-error rate 216 at the subsequent index 122 provides computational efficiency for the communication system 100. The channel-based probability function 418 including the outage probability function 422 approximating the block-error rate 216 at the subsequent index 122 provides computational efficiency by enabling the communication system 100 to characterize the channel 108 at the time of the subsequent index 122 without any look up tables or computationally complex channel estimation methods as applied to future behavior.

After generating the channel-based probability function 418, including the outage probability function 422 for estimating the block-error rate 216 at the subsequent index 122, the control flow can pass to the feedback determination module 408. The function generator module 406 can connect the output thereof to the input of the feedback determination module 408, store the channel-based probability function 418 at a location known and accessible to the feedback determination module 408, notify the feedback determination module 408, such as using a control signal or by setting a flag, or a combination thereof to pass the control flow, along with the channel-based probability function 418.

The feedback determination module 408 is for determining the stochastic channel indicator 116 for reporting qualities regarding the channel 108 to the base station 106. The feedback determination module 408 can determine the stochastic channel indicator 116 by determining a value of the feedback metric 420 that produces a target condition 426 from the channel-based probability function 418.

The target condition 426 is defined as situation or a set of factors that the communication system 100 seeks to establish. For example, the target condition 426 can be maximization of the throughput rate 218 of FIG. 2, production of a target error rate 428, or a combination thereof. The target error rate 428 is defined as a value of the block-error rate 216 that the communication system 100 seeks to establish. The target condition 426, including the target error rate 428, maximization of the throughput rate 218, or a combination thereof can be predetermined according to standards, the software developer, the hardware manufacturer or designer.

The feedback determination module 408 can determine the feedback metric 420 as an input to the channel-based probability function 418 that produces an output satisfying the target condition 426. The feedback determination module 408 can use mathematical operations and principles to determine maximums or minimums for different aspects of the channel-based probability function 418.

For example, the feedback determination module 408 can reconfigure the function for maximizing the throughput rate 218 using the outage probability function 422 or the block-error rate 216 at the subsequent index 122 as shown in equations (6)-(7), The equations (6)-(7) can be reconfigured to maximize the throughput rate 218 based on maximizing the transmission rate 214, minimizing the block-error rate 216, or a combination thereof.

The feedback determination module 408 can determine the stochastic channel indicator 116 as the value of the feedback metric 420 for the channel-based probability function 418 satisfying the target condition 426. For example, the feedback determination module 408 can determine the stochastic channel indicator 116 as the transmission rate 214 that can minimize the block-error rate 216, maximize the throughput rate 218, produce the block-error rate 216 equal to or below the target error rate 428, or a combination thereof.

The feedback determination module 408 can use the first control unit 312, the second control unit 334, or a combination thereof to determine the stochastic channel indicator 116. The feedback determination module 408 can store the stochastic channel indicator 116 in the first storage unit 314, the second storage unit 346, or a combination thereof.

It has been determined that the stochastic channel indicator 116 satisfying the target condition 426, including the target error rate 428, increases robustness for the communication system 100 while increasing effectiveness. The stochastic channel indicator 116 satisfying the target condition 426 increases robustness and effectiveness by determining the stochastic channel indicator 116 that reduces errors for the subsequent index 122, which can increase data transfer by reducing retransmissions.

The feedback output module 410 is for sending the stochastic channel indicator 116 to the base station 106. The feedback output module 410 can use the first communication unit 316, the first control unit 312, the second communication unit 336, the second control unit 334, or a combination thereof to send the stochastic channel indicator 116 to the base station 106.

The feedback output module 410 can send the stochastic channel indicator 116 for controlling communication at the base station 106 for communication through the mobile device 102 of FIG. 1. The base station 106 can control the communication by adjusting the communication protocol, speed, format, or a combination thereof based on the stochastic channel indicator 116. For example, the base station 106 can adjust the transmission rate 214, the modulation-coding scheme 212 of FIG. 2, other conditions represented in the format portion 208 of FIG. 2, or a combination thereof.

The adjustments by the base station 106 corresponding to the feedback output module 410, as reflected in the adjusted communication 118 of FIG. 1, can be used to communicate the actual message 202 of FIG. 2, such as through displaying images, reproducing sounds, or a combination thereof, to the user through the mobile device 102. The mobile device 102 can use the first user interface 318 of FIG. 3 to display images, reproduce sounds, or a combination thereof for communicating the actual message 202 to the user through the mobile device 102.

The feedback output module 410 can further send the stochastic channel indicator 116 for controlling the single-input single-output scheme 126 of FIG. 1 or the multiple-input multiple output scheme 128 of FIG. 1. The feedback output module 410 can send the stochastic channel indicator 116 for various schemes by adjusting the stochastic channel indicator 116 accordingly. The feedback output module 410 can also send the stochastic channel indicator 116 for various schemes by sending the stochastic channel indicator 116 as determined according to the corresponding communication scheme by the channel estimation module 402, the conditional calculation module 404, the function generator module 406, feedback determination module 408, or a combination thereof.

The communication system 100 has been described with module functions or order as an example. The communication system 100 can partition the modules differently or order the modules differently. For example, the functions of the function generator module 406 and the feedback determination module 408 can be combined. Also for example, the determination of the feedback metric 420 can be before functions of the conditional calculation module 404.

The modules described in this application can be hardware implementation or hardware accelerators in the first control unit 316 of FIG. 3 or in the second control unit 338 of FIG. 3. The modules can also be hardware implementation or hardware accelerators within the mobile device 102 or the base station 106 but outside of the first control unit 316 or the second control unit 338, respectively.

The physical transformation from the stochastic channel indicator 116 results in the movement in the physical world, such as the modulation-coding scheme 212, the format portion 208, the comparison portion 206, the message portion 204, or a combination thereof for the arriving communication 114 for communicating accurately the actual message 202, such that the user of the mobile device 102 can interact appropriately, including driving to the correct location with navigation guidance as the actual message 202. As the user and the mobile device 102 moves, the corresponding changes in the physical world, including changes to the channel 108, results in changes to the stochastic channel indicator 116.

Figure 5:
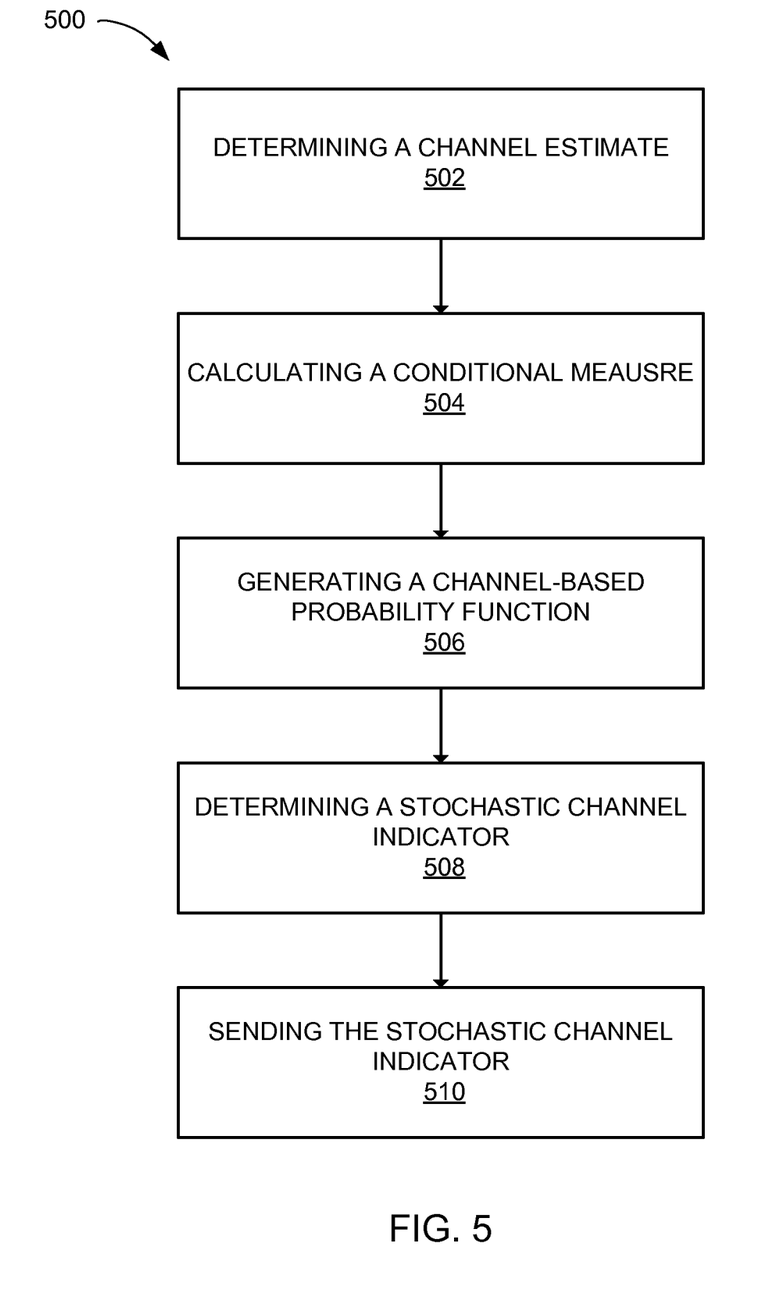
FIG. 5 is a flow chart of a method of operation of a communication system in a further embodiment of the present invention.

Referring now to FIG. 5, therein is shown a flow chart of a method 500 of operation of a communication system 100 in a further embodiment of the present invention. The method 500 includes: determining a channel estimate based on an arriving communication for characterizing a channel in a block 502; calculating a conditional measure based on the channel estimate for characterizing the channel at a subsequent index in a block 504; generating a channel-based probability function using the conditional measure, the channel-based probability function based on a feedback metric in a block 506; determining a stochastic channel indicator based on a value of the feedback metric producing a target condition from the channel-based probability function in a block 508; and sending the stochastic channel indicator for controlling communication at a base station for communication through a device in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance.

These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a communication system comprising:
    determining a channel estimate, with a control unit, based on an arriving communication at a receiving device for characterizing a channel;
    calculating a conditional measure based on the channel estimate for characterizing the channel at a subsequent index;

generating a channel-based probability function using the conditional measure, the channel-based probability function based on a feedback metric;

determining a stochastic channel indicator with the receiving device based on a value of the feedback metric producing a target condition resulting from the channel-based probability function when using the value of the feedback metric for input, the channel-based probability function for characterizing the channel for possible values of the feedback metric including the value of the feedback metric producing the target condition; and sending the stochastic channel indicator from the receiving device for controlling communication at a base station.

2. The method as claimed in claim 1 wherein calculating the conditional measure includes calculating a conditional probability using the channel estimate for calculating the conditional probability of the channel at the subsequent index given the channel estimate.

3. The method as claimed in claim 1 wherein generating the channel-based probability function includes calculating an outage probability function.

4. The method as claimed in claim 1 wherein generating the channel-based probability function includes calculating a block-error rate as a function of a transmission rate.

5. The method as claimed in claim 1 wherein generating the channel-based probability function includes generating the channel-based probability function when a repeat-request is available.

6. A method of operation of a communication system comprising:

determining a channel estimate, with a control unit, based on an arriving communication at a receiving device for characterizing a channel;

calculating a conditional probability based on the channel estimate for characterizing the channel with the conditional probability of the channel at a subsequent index given the channel estimate;

calculating a block-error rate based on the conditional probability, the block-error rate as a function of a transmission rate;

generating a channel-based probability function based on the block-error rate;

determining a stochastic channel indicator with the receiving device based on the transmission rate producing a target condition resulting from the channel-based probability function when using the value of the feedback metric for input, the channel-based probability function for characterizing the channel for possible values of the feedback metric including the value of the feedback metric producing the target condition; and sending the stochastic channel indicator from the receiving device for controlling communication at a base station.

7. The method as claimed in claim 6 wherein determining the stochastic channel indicator includes determining the transmission rate for maximizing a throughput rate.

8. The method as claimed in claim 6 wherein determining the stochastic channel indicator includes determining the stochastic channel indicator for producing a target error rate.

9. The method as claimed in claim 6 wherein calculating the block-error rate includes using the conditional probability for characterizing the channel at the subsequent index as a random variable without estimating the channel at the subsequent index.

10. The method as claimed in claim 6 wherein sending the stochastic channel indicator includes sending the stochastic channel indicator for controlling a single-input single-output scheme or a multiple-input multiple-output scheme.

11. A communication system comprising:
a control unit configured to:
determine a channel estimate based on an arriving communication at a receiving device for characterizing a channel;

calculate a conditional measure based on the channel estimate for characterizing the channel at a subsequent index;

generate a channel-based probability function using the conditional measure, the channel-based probability function based on a feedback metric;

determine a stochastic channel indicator with the receiving device based on a value of the feedback metric producing a target condition resulting from the channel-based probability function when using the value of the feedback metric for input, the channel-based probability function for characterizing the channel for possible values of the feedback metric including the value of the feedback metric producing the target condition; and an antenna, coupled to the control unit, configured to communicate the stochastic channel indicator from the receiving device for controlling communication at a base station.

12. The system as claimed in claim 11 wherein the control unit is configured to calculate a conditional probability using the channel estimate for calculating the conditional probability of the channel at the subsequent index given the channel estimate.

13. The system as claimed in claim 11 wherein the control unit is configured to calculate an outage probability function.

14. The system as claimed in claim 11 wherein the control unit is configured to calculate a block-error rate as a function of a transmission rate.

15. The system as claimed in claim 11 wherein the control unit is configured to generate the channel-based probability function when a repeat-request is available.

16. The system as claimed in claim 11 wherein:
the control unit is configured to:
calculate a conditional probability based on the channel estimate for characterizing the channel with the conditional probability of the channel at the subsequent index given the channel estimate;

calculate a block-error rate based on the conditional probability, the block-error rate as a function of a transmission rate;

determine the stochastic channel indicator based on the transmission rate producing the target condition from the channel-based probability function; and the antenna is configured to send the stochastic channel indicator for controlling communication at the base station for displaying on the device.

17. The system as claimed in claim 16 wherein the control unit is configured to determine the transmission rate for maximizing a throughput rate.

18. The system as claimed in claim 16 wherein the control unit is configured to determine the stochastic channel indicator for producing a target error rate.

19. The system as claimed in claim 16 wherein the control unit is configured to use the conditional probability for characterizing the channel for the subsequent index as a random variable without estimating the channel at the subsequent index.

20. The system as claimed in claim 16 wherein the antenna is configured to send the stochastic channel indicator for controlling a single-input single-output scheme or a multiple-input multiple output-scheme.

* * * * *